M. PATZAUER.
FLY TRAP.
No. 102,585. Patented May 3, 1870.
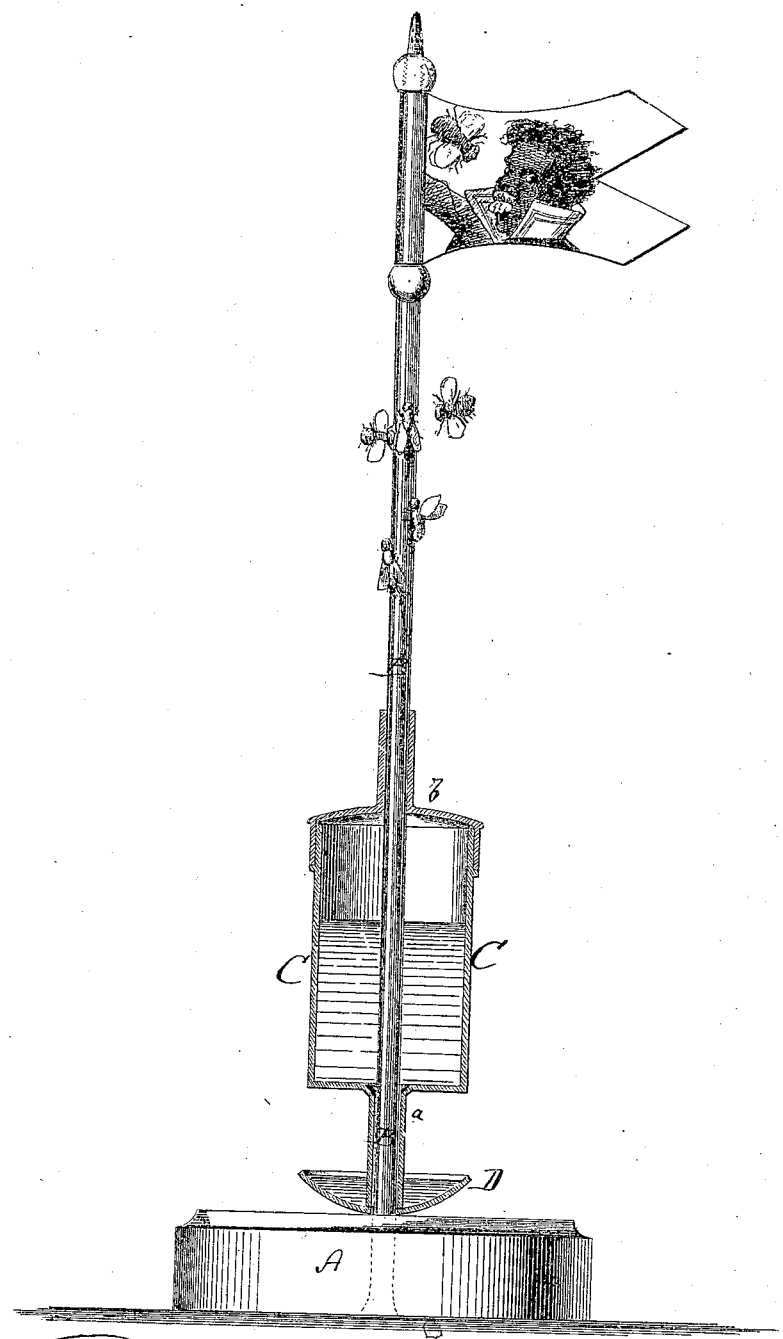

United States Patent Office.

MAX PATZAUER, OF NEW YORK, N. Y.

Letters Patent No. 102,585, dated May 3, 1870.

IMPROVED FLY-TRAP.

The Schedule referred to in these Letters Patent and making part of the same.

*To all whom it may concern:*

Be it known that I, MAX PATZAUER, of the city, county, and State of New York, have invented a new and improved Fly-Trap; and I do hereby declare that the following is a full, clear, and exact description of the same.

This invention relates to devices for attracting and destroying flies, and consists in the combination of parts brought together in the device hereinafter described.

A, in the drawing, represents the base; and

B, a perpendicular rod passing through the middle thereof.

C is a chamber formed around the rod for the reception of sirup or some sweet viscous substance mixed with any suitable poison or insect-destroyer.

D is a pan also surrounding the rod, and arranged to receive any drippings which may escape.

The chamber C is simply slided up the rod to impart thereto a slight coating of the contents, when the flies will be immediately drawn away from food or the persons of those present. They will collect in great swarms about the rod, where their lives will soon be destroyed.

The immense numbers of these troublesome little insects that can be destroyed in this manner, and the entire exemption obtained from their annoyance, must be seen to be appreciated.

Having thus described all that is necessary to a clear understanding of my invention,

What I desire to protect by Letters Patent is—

1. The base A, rod B, and chamber C, combined and arranged as and for the purpose specified.

2. The base A, rod B, and chamber C, combined with the dripping-pan D, all as and for the purpose described.

MAX PATZAUER.

Witnesses:
 GEO. W. MABEE,
 ALEX. F. ROBERTS.